2,951,079

2,4-BIS-HALOALKYL-6-ALKOXY-1,3,5-TRIAZINES AND THEIR PREPARATION

Hansjuergen A. Schroeder and Christoph J. Grundmann, Columbus, Ohio, assignors to Olin Mathieson Chemical Corporation, a corporation of Virginia No Drawing. Filed Aug. 15, 1957, Ser. No. 678,448

10 Claims. (Cl. 260—248)

This invention relates to certain novel 2,4-bis-haloalkyl-6-alkoxy-1,3,5-triazines and the method for their preparation.

It is known that 2,4,6-trichloro-s-triazine (cyanuric chloride) reacts with alcohols exclusively with formation of the corresponding alkylchloride and cyanuric acid. With ethanol, for example, the reaction proceeds in the following manner:

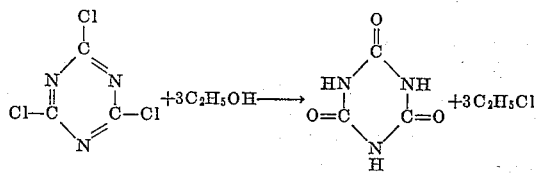

Alkoxy-s-triazines cannot be obtained by this reaction. Surprisingly, however, it has now been found that the 2,4-bis-haloalkyl-6-halo-s-triazines (Formula I below) react with aliphatic primary and secondary alcohols in quite a different manner. The halogen atom in 6-position is substituted by the corresponding alkoxy group while hydrogen halide is liberated. The haloalkyl groups in 2- and 4-position are not attacked, even when an excess of the alcohol is used.

The reaction proceeds according to the following general equation:

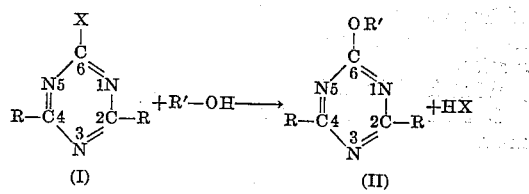

where X is a halogen, R is a haloalkyl group, e.g. chloromethyl, dichloromethyl, trichloromethyl, bromomethyl, tribromomethyl, 1,1-dichloroethyl, pentafluoroethyl, heptafluoropropyl and the like wherein the alkyl substituent contains up to 12 carbon atoms, and R' is a primary or secondary alkyl group with one to eight carbon atoms, for example, methyl, ethyl, isopropyl, n-propyl, n-butyl, isoamyl, n-hexyl or n-octyl. The useful halogens include fluorine, bromine, chlorine and iodine. The new compounds are 2,4-bis-haloalkyl-6-alkoxy-1,3,5-triazines of the Formula II above.

The reaction of the compounds of Formula I and the alcohol is carried out by admixing the reactants. Preferably, the 2,4-bis-haloalkyl-6-halo-s-triazine is mixed with an excess of the alcohol and the mixture is heated until the calculated amount of hydrogen halide is liberated. This point can easily be determined by taking an aliquot part of the reaction mixture and titrating the liberated hydrogen halide by a conventional method. The preferred reaction temperatures lie between about 50° and about 100° C. The required reaction time may vary according to the alcohol used between a few minutes and several hours. The desired reaction product can easily be obtained by evaporating the excess of alcohol and the formed hydrogen halide. The yields are in general good to excellent. If necessary, the remaining crude product can be purified by crystallization from a suitable solvent, or, if liquid, by vacuum distillation.

The novel compounds thus prepared, the 2,4-bis-haloalkyl-6-alkoxy-s-triazines, are useful as agriculturals as they possess besides insecticidal and fungicidal properties a pronounced herbicidal activity. Especially valuable in this respect is the 2,4-bis-trichloromethyl-6-ethoxy-1,3,5-triazine which is an excellent pre-emergence herbicide. At proper dosage it is highly selective, i.e., it destroys the noxious weeds while valuable crops are not attacked at all.

The starting compounds 2,4-bis-haloalkyl-6-halo-1,3,5-triazines of Formula I can be prepared by reacting phosphorus oxyhalides, preferably phosphorus oxychloride or phosphorus oxybromide, with the double salts of 2,4-bis-haloalkyl-6-hydroxy-1,3,5-triazine with amidines as described or in pending application Serial No. 529,928, filed August 22, 1955, of Schroeder and Grundmann. The amidine salts are described in pending application, Serial No. 529,927, filed August 22, 1955, of Schroeder and Grundmann. The amidine salts have the formula:

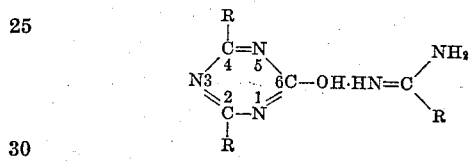

wherein R is a haloalkyl radical. These salts are prepared by the reaction of phosgene with haloalkyl amidines. In preparing the compounds of Formula I the 6-hydroxytriazine or its amidine salt is refluxed with an excess of the phosphorus oxyhalide at temperatures of about 100° to 200° C. It is advantageous in some cases to include in the reaction mixture sufficient of a tertiary amine, for example, triethylamine, to combine with the HCl formed. After a few hours refluxing, much of the excess phosphorus oxyhalide is suitably removed by distillation and the halotriazine is recovered by crystallization. It is suitably purified by recrystallization.

The novel compounds of this invention and their preparation will be further illustrated by the following examples.

EXAMPLE I

2,4-bis-trichloromethyl-6-ethoxy-s-triazine

A solution of 25 grams of 2,4-bis-trichloromethyl-6-chloro-s-triazine in 130 milliliters of absolute ethanol is kept at 55° C. for 40 minutes. After distilling off the alcohol and the formed hydrogen chloride the remainder is dissolved in Skellysolve F, filtered from insoluble by-products, and the filtrate evaporated. The oily residue is purified by vacuum distillation, B.P. 135° C. at 0.1 mm. pressure, $n_D^{23°}$ 1.5332. Yield: 24 grams, corresponding to 94% of the theory.

Calcd. for $C_7H_5Cl_6N_3O$: C, 23.36; H, 1.40; N, 11.95; Cl, 59.12. Found: C, 23.53, 23.21; H, 1.46, 1.35; N, 11.90, 11.79; Cl, 59.03, 59.28.

EXAMPLE II

2,4-bis-trichloromethyl-6-methoxy-s-triazine

A solution of 5 grams of 2,4-bis-trichloromethyl-6-chloro-s-triazine in 40 milliliters of methanol was refluxed for 40 minutes. Then the excess-methanol and the hydrogen chloride formed was evaporated i.v. at 55° C. The reaction product was dissolved in 50 milliliters of Skellysolve F, the precipitated by-product was filtered off. Upon evaporation of the solvent there remained an oily residue which solidified within two hours.

Recrystallization from Skellysolve F gave 3.8 grams (77% of the theory), M.P. 46° C.

Calcd. for $C_6H_3Cl_6N_3O$: C, 20.84; H, 0.87; N, 12.15; Cl, 61.51. Found: C, 20.77, 20.67; H, 0.89, 0.84; N, 12.33, 12.53; Cl, 61.93, 62.23.

EXAMPLE III

2,4-bis-trichloromethyl-6-isopropoxy-s-triazine

A solution of 4.3 grams of 2,4-bis-trichloromethyl-6-chloro-s-triazine in 30 milliliters of isopropanol was kept at 60° C. for 30 minutes. After evaporation of the excess-alcohol and the HCl formed, 30 milliliters of Skellysolve F was added. The solution was filtered after five hours and the solvent was evaporated. The residual 2,4-bis-trichlyoromethyl-6-isopropoxy-s-triazine was purified by vacuum distillation; B.P. 1 mm.: 157° C., yield: 3.7 grams (80% of the theory).

Calcd. for $C_8H_7Cl_6N_3O$: C, 25.70; N, 1.89; N, 11.24; Cl, 56.90. Found: C, 24.61, 24.45; N, 1.90, 2.11; N, 11.57, 11.73; Cl, 57.14, 57.39.

EXAMPLE IV

2,4-bis-pentafluoroethyl-6-ethoxy-s-triazine

A solution of 6 grams of 2,4-bis-pentafluoroethyl-6-chloro-s-triazine in 40 milliliters of absolute ethanol was kept at 50° C. for 30 minutes. Then the excess-ethanol and the HCl formed was evaporated, the reaction product was purified by dissolving it in Skellysolve F and filtration, followed by evaporation of the solvent. The oily residue was distilled i.v., B.P. 150 mm.: 122° C., $n_D^{23.4°}$, 1.3588. Yield: 4.4 grams (71% of the theory).

Calcd. for $C_9H_5F_{10}N_3O$: C, 29.93; H, 1.40; N, 11.64. Found: C, 30.52, 30.28; H, 1.95, 2.01; N, 11.63, 11.84.

EXAMPLE V 2,4-bis-trichloromethyl-6-ethoxy-s-triazine was tested as a pre-emergence herbicide at 16 lb./acre. For comparison the commercial herbicide 3-(p-chlorophenyl)-1,1-dimethyl urea (CMU) was tested simultaneously at 4 lb./acre.

PERCENT ACTIVITY

| Chemical | Rye grass | Mustard | Pigweed | Cotton | Soybean | Corn | Wheat |
|---|---|---|---|---|---|---|---|
| 2,4-bistrichloromethyl-6-ethoxy-s-triazine | 80 | 80 | 90 | 0 | 0 | 0 | 0 |
| 3-p-chlorophenyl-1,1-di-methyl urea (CMU) | 90 | 90 | 90 | 40 | 40 | 50 | 70 |

These results show that the 2,4-bis-trichloromethyl-6-ethoxy-s-triazine is a highly selective herbicide. Even at a dosage four times higher than that of CMU it had no measurable activity on such valuable crops as cotton, soybean, corn, and wheat.

For use as a pre-emergence herbicide the novel 2,4-bis-halo-alkyl-6-alkoxy-s-triazines may be suitably formulated as wettable powders or as emulsifiable concentrates. Siliceous clays or talc in finely divided form are suitable diluents for wettable powders.

A 40 percent wettable powder can be prepared having the following composition:

| Component | Percent by weight |
|---|---|
| Product of Example I | 40 |
| "Barden Clay" | 50 |
| "Igepon T-73" | 5 |
| "Marasperse N", a highly purified lignosulfonate | 5 |
| | 100 |

This test was carried out in the manner described by W. C. Shaw and C. R. Swanson, in Weeds, I, 352–65 (1952). The chemical to be tested in this case, 2,4-bis-trichloromethyl-6-ethoxy-s-triazine, was applied to metal flats in which were seeded crop and weed species. The flats were prepared by putting 8 quarts of soil into each and planting lengthwise one row of each of four crops. The crops used were corn (15 seeds), cotton (30 seeds), soybeans (15 seeds) and wheat (3 cc). These were covered with two quarts of soil and a mixture of weed seeds was scattered evenly over this soil. This mixture contained mustard (*Brassica kaber*) 3 cc., pigweed (*Amaranthus retroflexus*) 1 cc., and ryegrass (*Lolium multiflorum*) 4 cc. These seeds were covered with two quarts of soil and the result was a flat with crops planted at a depth of 1½ inch and the weeds planted at a depth of about ¼ inch.

The chemicals to be tested were applied by spraying to the flats as an acetone solution.

The 2,4-bis-trichloromethyl-6-ethoxy-s-triazine was applied to the flats in acetone solution as a spray at a rate of 16 lb./acre while the control chemical, 3-(p-chlorophenyl)-1,1-dimethyl urea (CMU, a commercial herbicide) was applied at the rate of 4 lb./acre both by a machine especially designed for testing purposes. In addition to the control herbicide, check flats which were not treated were also prepared and sent to the greenhouse along with the treated flats.

The plants were allowed to grow in a greenhouse for about ten days during which time factors such as temperature, soil moisture and light were kept as constant as was feasible. Then a visual estimate of the amount of injury to each of the weed and crop species was made. This estimate was recorded for each species on a scale of 0–10, 0 indicating no injury and 10 indicating complete killing. Next measurements of plant heights of the four crop species were made and height reductions as percent of the height of control plants were calculated. Third, stand counts were made of the corn, soybeans and cotton. Stand reductions were calculated as percent of the stand in control flats; the percent stand reduction for wheat and the three weed species was estimated. After converting to 0–10 injury ratings to a percentage basis, the average of the injury rating height reductions and stand reduction for each crop and for each weed was made. The resulting value is the percent herbicide activity of the chemical for a single species as shown in the table of Example V which can be used to compare the effectiveness of various chemicals against the crop and weed species.

What is claimed is:

1. 2,4-bis-haloalkyl-6-alkoxy-1,3,5-triazines of the formula

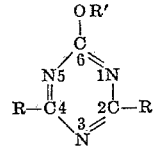

wherein R is a haloalkyl radical containing from 1 to 12 carbon atoms and R' is an alkyl radical containing from 1 to 8 carbon atoms.

2. 2,4-bis-trichloromethyl-6-ethoxy-1,3,5-triazine.
3. 2,4-bis-trichloromethyl-6-methoxy-1,3,5-triazine.
4. 2,4-bis-trichloromethyl-6-isopropoxy-1,3,5-triazine.
5. 2,4-bis-pentafluoroethyl-6-ethoxy-1,3,5-triazine.
6. The method of preparing 2,4-bis-haloalkyl-6-alkoxy-1,3,5-triazines of the formula

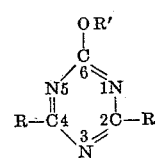

wherein R is a haloalkyl radical and R' is an alkyl radical, which comprises reacting a 2,4-bis-haloalkyl-6-halo-1,3,5-triazine of the formula

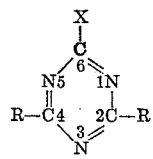

wherein R is a haloalkyl radical containing from 1 to 12 carbon atoms and X is a halogen, with an alcohol selected from the group consisting of primary and secondary alcohols of the formula

R'OH wherein R' is an alkyl radical containing from 1 to 8 carbon atoms, at a temperature of about 50 to about 100° C.

7. The method of preparing 2,4-bis-trichloromethyl-6-ethoxy-1,3,5-triazine which comprises reacting 2,4-bis-trichloromethyl-6-chloro-1,3,5-triazine with ethanol at a temperature of about 50 to about 100° C.

8. The method of preparing 2,4-bis-trichloromethyl-6-methoxy-1,3,5-triazine which comprises reacting 2,4-bis-trichloromethyl-6-chloro-1,3,5-triazine with methanol at a temperature of about 50 to about 100° C.

9. The method of preparing 2,4-bis-trichloromethyl-6-isopropoxy-1,3,5-triazine which comprises reacting 2,4-bis-trichloromethyl-6-chloro-1,3,5-triazine with isopropanol at a temperature of about 50 to about 100° C.

10. The method of preparing 2,4-bis-pentafluoroethyl-6-ethoxy-1,3,5-triazine which comprises reacting 2,4-bis-pentafluoroethyl-6-chloro-1,3,5-triazine with ethanol at a temperature of about 50 to about 100° C.

References Cited in the file of this patent

Dudley et al.: Journal of the American Chemical Society, vol. 73, pp. 2986–2990 (1951).